United States Patent
Yamashita

(10) Patent No.: US 7,321,544 B2
(45) Date of Patent: Jan. 22, 2008

(54) OPTICAL RECORDING MEDIUM INCLUDING IDENTIFICATION REGION CONSTITUTED OF PROTRUSIONS AND RECESSES

(75) Inventor: Satoshi Yamashita, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 700 days.

(21) Appl. No.: 10/626,270

(22) Filed: Jul. 24, 2003

(65) Prior Publication Data

US 2004/0190434 A1   Sep. 30, 2004

(51) Int. Cl.
*G11B 7/24* (2006.01)
(52) U.S. Cl. .................. 369/275.3; 369/275.4
(58) Field of Classification Search ............. None
See application file for complete search history.

(56) References Cited

U.S. PATENT DOCUMENTS

| | | | |
|---|---|---|---|
| 5,604,726 A * | 2/1997 | Karube | 369/275.4 |
| 5,892,752 A * | 4/1999 | Matsuura | 369/275.4 |
| 6,226,257 B1 * | 5/2001 | Morimoto | 369/275.4 |
| 6,233,219 B1 * | 5/2001 | Hori et al. | 369/275.4 |
| 7,050,383 B2 * | 5/2006 | Nakajima et al. | 369/275.3 |

FOREIGN PATENT DOCUMENTS

| | | |
|---|---|---|
| JP | 62-078729 | 4/1987 |
| JP | 2-087344 | 3/1990 |
| JP | 6-301976 | 10/1994 |
| JP | 7-073508 | 3/1995 |
| JP | 9-017033 | 1/1997 |

\* cited by examiner

*Primary Examiner*—Tan Dinh
(74) *Attorney, Agent, or Firm*—Greer, Burns & Crain, Ltd.

(57) ABSTRACT

The present invention is intended to provide an information recording medium in which ID regions (identification regions) have a high recording density. The information recording medium according to the present invention has identification regions where identification information is recorded by means of protrusions and recesses provided on edges of the information storage stripe along the width of the information storage stripe.

1 Claim, 9 Drawing Sheets

OPTICAL RECORDING MEDIUM INCLUDING IDENTIFICATION REGION CONSTITUTED OF PROTRUSIONS AND RECESSES

TECHNICAL FIELD

The present invention relates to an information recording medium on which information is recorded in each of multiple sectors.

BACKGROUND ART

Optical recording media on which information is accessed by means of a laser beam spot have conventionally been used widely as optical recording media which allow voice signals and image signals to be recorded and reproduced, In particular, magneto-optical disks on which information is recorded by means of heat from a laser beam spot,and a magnetic field from a magnet, phase-change optical disks on which information is recorded by means of phase changes caused by heat from a laser beam spot, etc. have been attracting attention as rewritable high-density recording media and research and development have been conducted intensively. Recently, amid strong demand for improvement in recording density of information recording media, technologies, such as magnetic super resolution (MSR) which limits a reproducible object to a smaller region than a laser spot by applying a reproducing magnetic field, have been sought to improve linear recording density greatly.

Such optical recording media are generally disk-shaped and have spiral or concentric tracks to record information. Each track is divided into plural sectors, each of which contains an ID region and data region. The ID region records ID data including a sector mark which indicates the start of the sector, address information which distinguishes the sector from other sectors, etc., while the data region records image data, voice data, document data, etc. Each optical recording medium is accessed on a sector-by-sector basis and the sector to be accessed is identified based on the ID data in the ID region.

Methods available to record and reproduce information in the data region include magneto-optical, phase-change, magnetic super resolution, and other recording methods. High recording densities have been achieved with research and development of recording methods.

However, all methods for recording ID data in ID regions use irregularities (emboss pits) in a substrate regardless of the type of recording medium and cannot read pits smaller in diameter than the beam. This reduces recording densities, making it necessary to provide a large area as the ID regions. Consequently, there is strong demand to improve the recording densities of the ID regions and reduce the area of the ID regions, thereby increasing total memory capacity of information recording media.

DISCLOSURE OF THE INVENTION

In view of the above circumstances, the object of the present invention is to provide an information recording medium in which ID regions have a high recording density. By increasing the recording density of ID regions, it is possible to reduce the area of the ID regions and increase total memory capacity.

To achieve the above object, a first information recording medium of the present invention is an information recording medium provided with multiple long, narrow information storage stripes each of which records data, the information recording medium having in each of the multiple long, narrow information storage stripes:

a data region where the data are recorded; and an ID region where an ID is recorded by means of protrusions and recesses provided on edges of the information storage stripe along the width of the information storage stripe to distinguish the long, narrow information storage stripe from the other long, narrow information storage stripes.

The meaning of "protrusions and recesses" includes curvilinear meandering, rectangular projections and depressions, zigzag bends, etc. and a simple expression "protrusions and recesses" encountered in the following description includes the above meaning.

Also, the "long, narrow information storage stripes" mean, for example, tracks, sectors, etc.

The information recording medium of the present invention, which reads an ID when an end of a bean spot passes over the edges protruded and recessed along the width, can read even an ID which has been recorded at high density, based on a principle described below. Thus, it can increase recording density of the ID regions and reduce their area, and thereby increase the total recording capacity of the information recording medium.

Preferably, the ID region in the first information recording medium of the present invention constitutes protrusions and recesses arranged symmetrically on both edges of the long, narrow information storage stripe with respect to a center line of the long, narrow information storage stripe.

To avoid inter-track cross talk and the like, it is desirable that the beam spot moves along the center line of each information storage stripe such as a track and a sector during access. Generally, in order for the team spot to move along the center line of the information storage stripe, the beam spot is made to trace the center between both edges of the information storage stripe.

On the first information recording medium of the present invention, the ID is recorded by means of protruded and recessed edges of the information storage stripe and the symmetrical protrusions and recesses in both edges of the storage stripe with respect to the center line of the information storage stripe ensures that the beat spot moves along the center line of the information storage stripe.

Preferably, the ID region in the first information recording medium of the present invention constitutes tapered protrusions on edges of the information storage stripe, toward a center line of the information storage stripe.

By tapering toward the center line of the information storage stripe, the protrusions on the edges of the information storage stripe reduces the effect of light near the center of the beam spot. This enhances the advantage of the beam spot end passing over the edges.

Furthermore, in the first information recording medium of the present invention, it is preferable that data are recorded in the data region by a magneto-optical recording method or phase-change recording method.

Also, it is preferable that the information storage stripes are sectors provided on both land tracks and groove tracks arranged alternately.

If the present invention is applied to high-density information recording media such as magneto-optical disks, phase-change recording media, or land-and-groove recording method media, it can increase total recording capacity greatly because of a large difference between the recording density in the ID regions and recording density in the data regions even if the area of the ID regions is not reduced much. For example, on a magneto-optical disk based on a land-and-groove recording method, a mere 1% reduction of the ID regions is expected to produce a large capacity increase of approximately 3 Mbytes in the entire medium.

A second information recording medium of the present invention to achieve the above object is an information recording medium provided with land tracks and groove tracks arranged alternately, both of which contain long, narrow information storage stripes for recording data, the information recording medium having in each of the information storage stripes;

a data region which records the data and in which edges of the information storage stripe are approximately linear; and an ID region which records an ID for distinguishing the information storage stripe from the other information storage stripes and in which edges of the information storage stripe are protruded and recessed along the width.

A third information recording medium of the present invention to achieve the above object is an information recording medium provided with land tracks and groove tracks arranged alternately, both of which contain long, narrow information storage stripes for recording data, the information recording medium having in each of the information storage stripes:

a data region where the data are recorded; and an ID region where an ID is recorded by means of protrusions and recesses provided on boundaries between the land tracks and groove tracks along the width of the land tracks and groove tracks to distinguish the information storage stripe from the other information storage stripe, and the ID region further having a land ID section where the boundary between the land track and groove track is offset to the land track on average and a groove ID section where the boundary between the land track and groove track is offset to the groove track on average.

On recording media based on the land-and-groove recording method, information storage stripes exist on both sides of the boundary between the land track and groove track. Thus, if an ID is recorded by means of protrusions and recesses on the boundary, preferably the ID regions has a structure which allows it to identify the information storage stripe which corresponds to the recorded ID.

In the ID regions of third information recording medium of the present invention, the land ID section has a narrow track width and the groove ID section has a wide track width in the case of land tracks while conversely the groove ID section has a narrow track width and the land ID section has a wide track width in the case of groove tracks. Therefore, the ID for an information storage stripe is stored in the land ID section or groove ID section whichever has a narrow track width, making it easy to identify correspondence between the information storage stripe and ID.

BEST MODE FOR CARRYING OUT THE INVENTION

An embodiment of the present invention will be described below.

Figure 1:
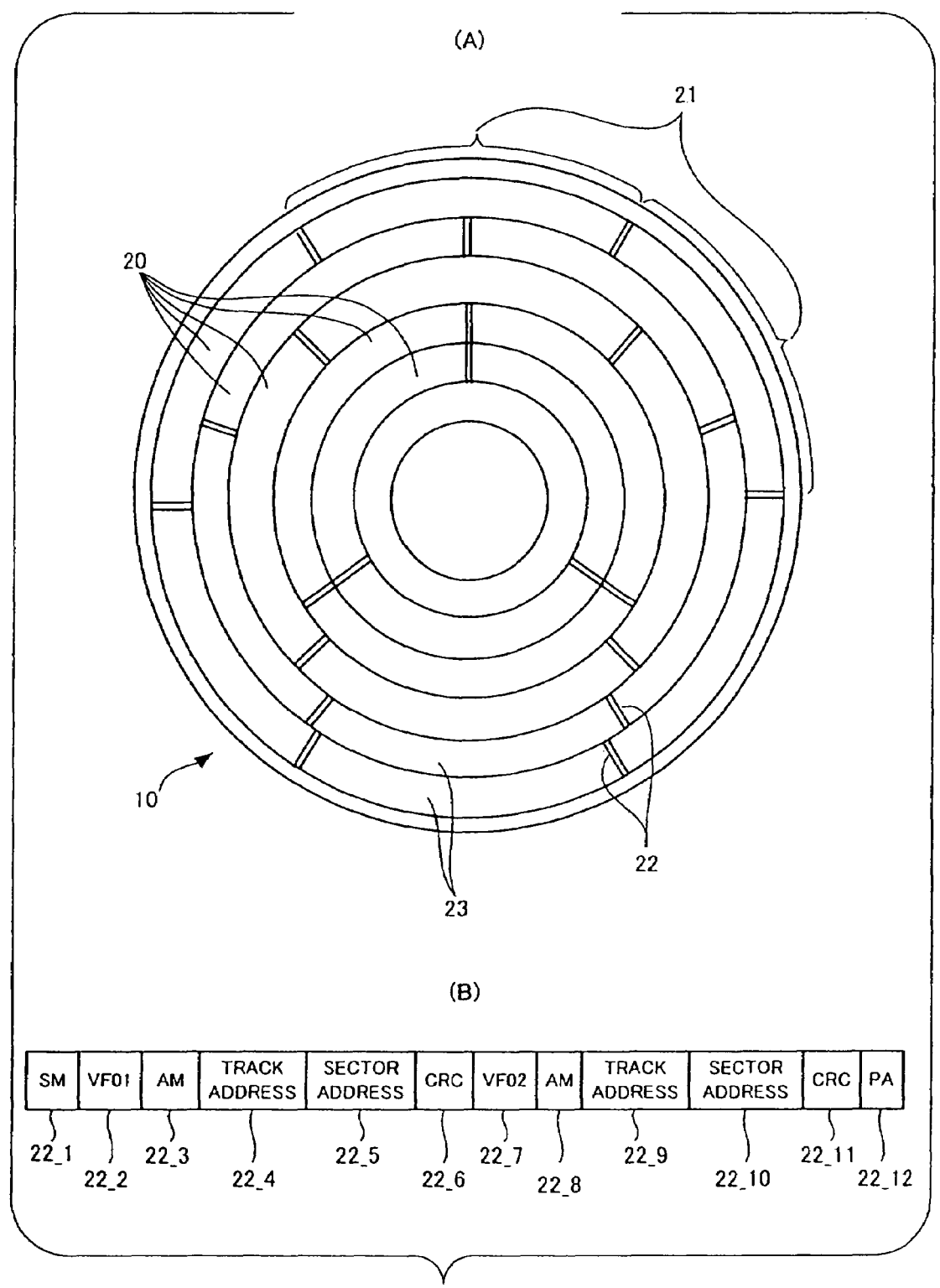
FIG. 1 is a conceptual diagram showing an embodiment of an information recording medium according to the present invention.

FIG. 1 is a conceptual diagram showing an embodiment of an information recording medium according to the present invention.

An information recording medium 10 shown in Part (A) of FIG. 1 is a magneto-optical disk. A large number of nearly circular tracks each of which makes a circuit around the center of the information recording medium 10 are provided on a surface of the information recording medium 10. The front end of each track is connected to the rear end of another track forming two spirals as a whole.

Also, so-called ZCAV (Zone Constant Angular Velocity) zones 20 are provided concentrically on the information recording medium 10 and each zone 20 contains a thousand or more tracks. Each track is divided into sectors 21. The number of sectors in a track has been set for each zone 20. In this case, one track is divided into three sectors in the innermost zone 20 and one track is divided into six sectors in the outermost zone 20.

Each sector 21 contains an ID region 22 and data region 23: ID data including a sector mark which indicates the start of the sector and addresses which distinguish the sector from other sectors are recorded in the ID region 22 using surface geometries of the substrate, while image data, document data, etc. are recorded in the data region 23. However, for the sake of illustration, FIG. 1 shows the sectors 21, ID regions 22, and data regions 23 as a bundle of sectors 21, a bundle of ID regions 22, and a bundle of data regions 23 in a thousand or more tracks contained in each zone 20.

Part (B) of FIG. 1 shows content of the ID data recorded in the ID region 22. The ID data contains a sector mark 22_1, first VFO synchronization signal 22_2, first address mark 22_3, first track address 22_4, first sector address 22_5, first error correction signal 22_6, second VFO synchronization signal 22_7, second address mark 22_8, second track address 22_9, second sector address 22_10, second error correction signal 22_11, and postamble 22_12.

The sector mark 22_1 indicates the start of the sector.

The first and second VFO synchronization signals 22_2 and 22_7 are signals which indicate VFO synchronization when the first and second track addresses 22_4 and 22_9 and the first and second sector addresses 22_5 and 22_10 are read.

The first and second address marks 22_3 and 22_8 indicate the beginning of the first and second track addresses 22_4 and 22_9.

The first and second track addresses 22_4 and 22_9, which indicate the same address, distinguish the given track from among a large number of tracks on the information recording medium 10. The first and second sector addresses 22_5 and 22_10, which indicate the same address, distinguish the given sector from other sectors on a track. By recording addresses redundantly in this way, it is possible to keep error rates in address data at sufficiently low levels.

The first and second error correction signals 22_6 and 22_11 are codes used to check for errors in the first and second track addresses 22_4 and 22_9 as well as in the first and second sector addresses 22_5 and 22_10.

The postamble 22_12 indicates the end of the ID region 22.

Next, a recording method of such ID data will be described.

Figure 2:
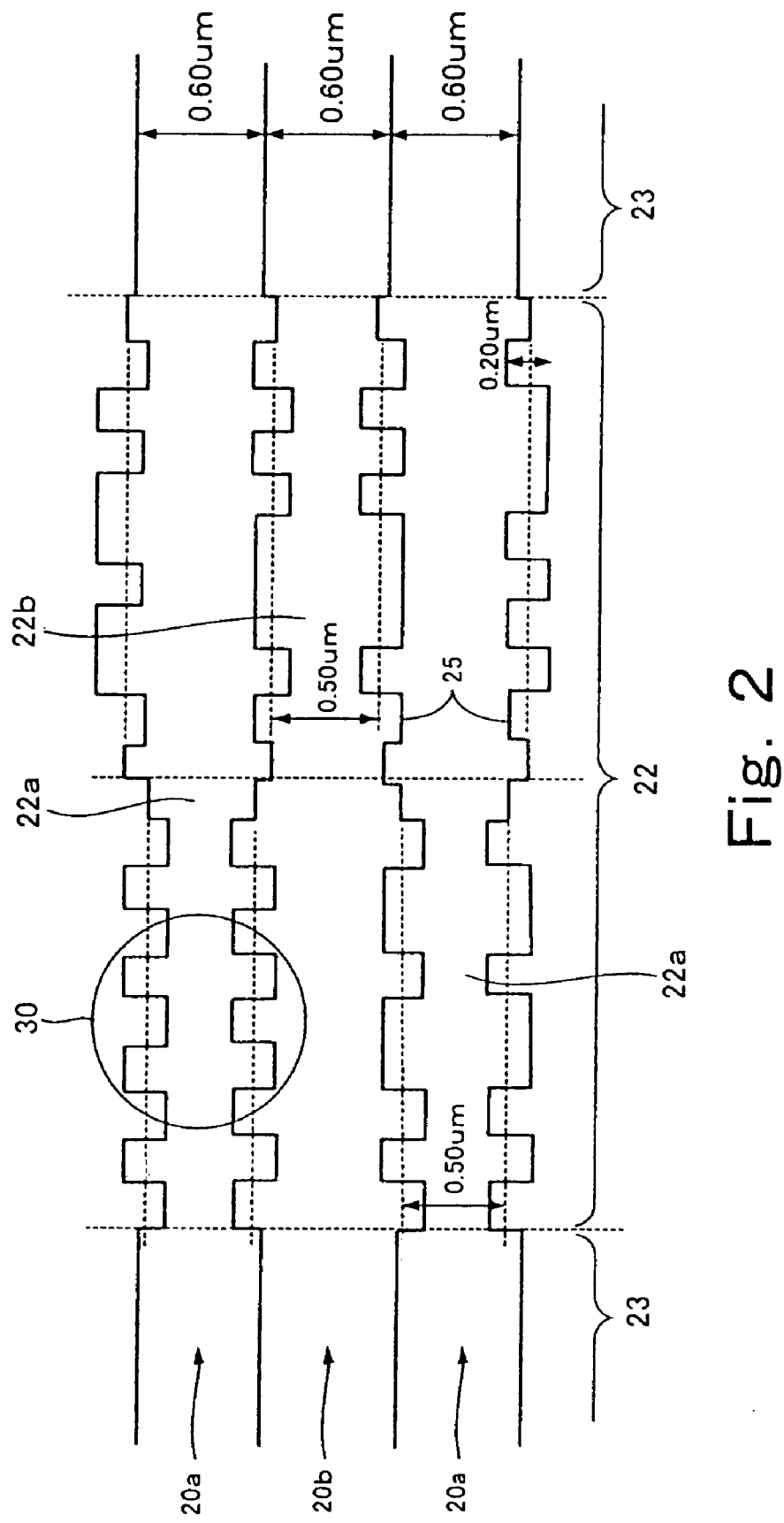
FIG. 2 is a detailed view showing an embodiment of an information recording medium according to the present invention.

FIG. 2 is a detailed view showing an embodiment of an information recording medium according to the present invention.

The figure shows the ID region 22 and its neighborhood in detail, wherein three tracks are shown representatively.

The information recording medium 10 shown in FIG. 1 employs a land-and-groove recording method according to which groove-like tracks (grooves) 20a and ridge-like tracks (lands) 20b are provided alternately. One of the two spirals is formed by a large number of grooves and the other is formed by a large number of lands. The middle one of the three tracks shown in FIG. 2 is a land 20b and the tracks on both sides of the land 20b are grooves 20a.

There is a height difference between lands 20b and grooves 20a and consequently there are stepped walls 25 between lands 20b and grooves 20a. The walls 25 constitute edges of sectors provided in the lands 20b and grooves 20a as well as serve as boundaries between grooves 20a and lands 20b.

The ID region 22 provided in each sector is composed of a part 22a in which groove ID data are recorded and a part 22b in which land ID data are recorded. These parts 22a and 22b are arranged in sequence along the length of the tracks. The groove data parts 22a are used to access sectors in grooves 20a and the land data parts 22b are used to access sectors on lands 20b.

In the ID region 22, the stepped wall 25 between land 20b and groove 20a is protruded and recessed along the width of the sector. The ID data shown in Part (B) of FIG. 1 are recorded through such protrusions and recesses of the wall 25. The ID data recorded through protrusions and recesses of the wall 25 or the wall 25 deformed by protrusions and recesses may be referred to below as a "wall ID." Effects of the wall ID will be described later.

As an example of the protruded and recessed walls 25, geometry with rectangular projections,and depressions is used here. Regarding shape of the wall 25, besides the one shown in FIG. 2, curvilinear meandering or zigzag bends may be used. Concrete examples of the shape of the wall 25 will be described later.

As the protruded and recessed geometry of the walls 25, a symmetrical geometry with respect to the center line of the track and sector is used here. A laser beam spot 30 is made to keep equal distances from both edges of the track 20 and moves along the center line of the track 20.

There are data regions 23 before and after the ID region 22. The edges of the data regions 23 are approximately linear.

A structure called a wobble track has been known which records synchronization signals and the like using meandering of sectors or tracks themselves in data regions 23. The wobble track coexists with the data recorded in the data regions 23, and thus it is characterized in that its track width is constant and that the meandering is gentle to the extent that the wobble track data can be distinguished clearly from the data recorded in the data regions 23. Besides, to access an information recording medium which uses a wobble track, a complicated detection system is needed to accommodate the gentle meandering of the wobble track.

In contrast, since the wall ID is provided in the ID region 22, the wall 25 can be protruded and recessed to the extent that the track width varies greatly in order to intensify ID signals. Also, to increase the recording density in the wall ID, it is possible to make the wall 25 to be protruded and recessed greatly. Furthermore, the ID data recorded by means of the wall ID can be read out using a simple detection system such as a TPP detection system described later.

Now, technology for producing the information recording medium will be described.

First, lands and grooves such as those described above are formed on a master. Next, a substrate for the information recording medium is produced by injection molding using the master. Then, recording medium films including a reflective layer, recording layer, and protective layer are formed on the substrate by sputtering and the like.

Known technologies for forming lands and grooves on a master include laser beam machining technology which cuts grooves on the master by laser light. The laser beam machining technology forms emboss pits by turning on and off laser light according to ID signals which represent ID data such as those described above.

By using the laser beam machining technology in a manner described below, it is possible to form lands and grooves which have wall IDs.

In data regions, grooves are cut in the conventional manner. In ID regions grooves with a wall ID are cut as intensity of laser light is varied according to ID signals rather than the laser light is turned on and off according to the ID signals. In the ID regions, after the grooves with a wall ID are cut, the remaining part becomes lands with a wall ID. Incidentally, the ID signals may be ID signals based on a mark length recording method or mark position recording method. In the wall IDs formed according to such ID signals, protrusions and recesses with respect to the center line of the track correspond to marks and spaces in mark-spacing of conventional emboss pits.

The wall IDs formed in this way are detected based on changes in the quantity of reflected light as described later.

Since the information recording medium according to the present embodiment is a magneto-optical disk as described above, in the data regions 23, information is recorded and reproduced to/from the recording medium films by a magneto-optical recording method. The magneto-optical recording method records information using a recording magnetic field and heat of laser light and reproduces information by detecting rotation of irradiating light for reproduction in the direction of polarization, as described later.

Figure 3:
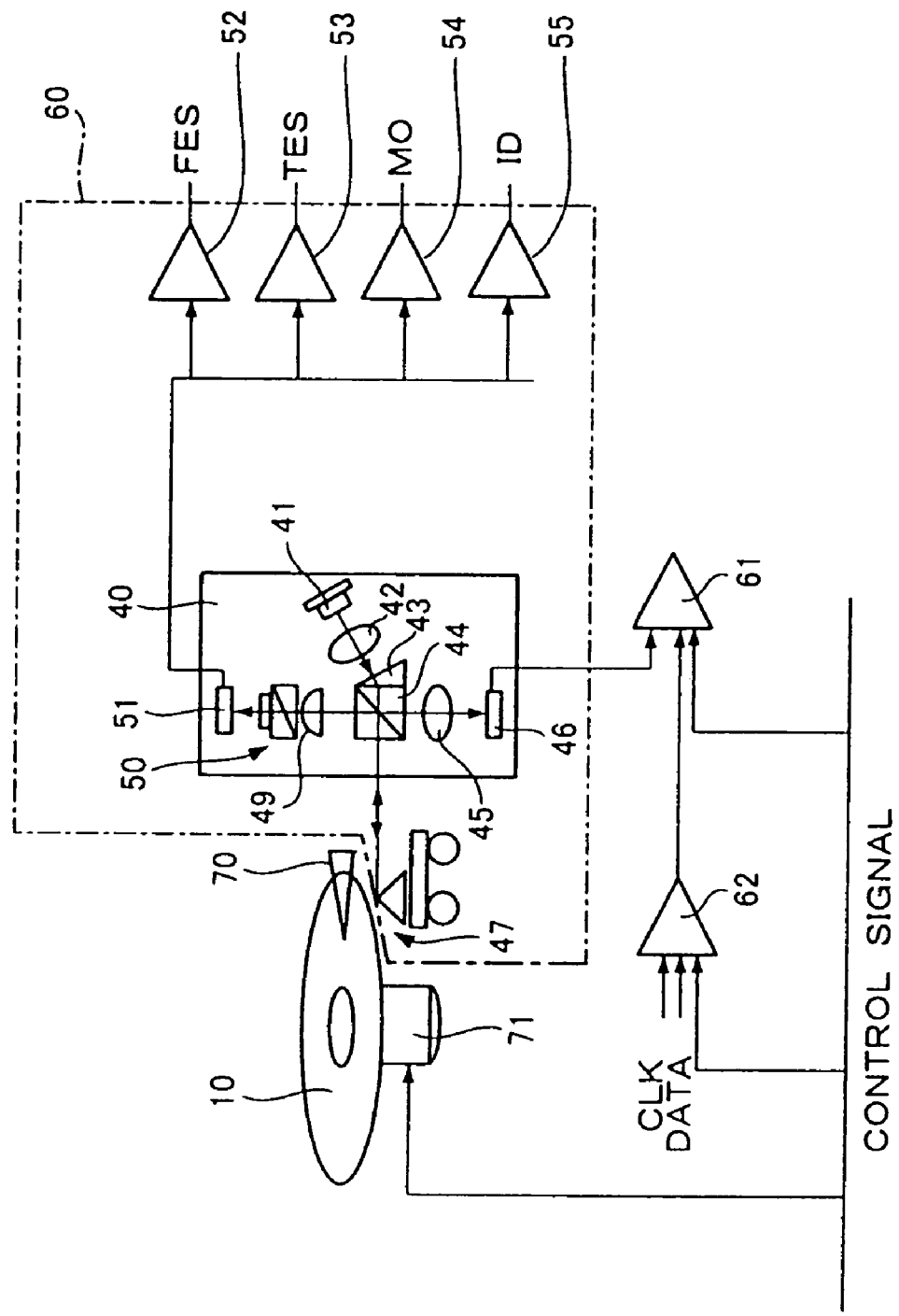
FIG. 3 is a conceptual block diagram showing a main section of an information storage device which accesses the information recording medium shown in FIGS. 1 and 2.

FIG. 3 is a conceptual block diagram showing a main section of an information storage device which accesses the information recording medium shown in FIGS. 1 and 2.

A light pickup 60 has a fixed optical system 40 equipped with a laser diode and light receiving element, a carriage 47 which moves a light beam along the information recording medium 10, and adder-subtractor circuits 52, 53, 54, and 55 which determines various signals according to the light received by the light receiving element.

The laser diode 41 of the fixed optical system 40 emits laser light as a diffused light flux with an elliptical cross section. The intensity of the laser light emitted by the laser diode 41 is controlled by a laser diode drive circuit 61. The laser diode drive circuit 61 controls the laser diode 41 according to write data generated by a write data generating circuit 62.

The laser light emitted by the laser diode 41 enters a beam splitter 44 after passing through a coupling lens 42 which converts a diffused light flux into a parallel light flux and a circularity correction lens 43 which makes the cross section of the laser light flux completely round. Reflected light from the beam splitter 44 is gathered by a lens 45 and received by a light receiving element 46 for monitoring emergent light. Output light from the light receiving element 46 for monitoring emergent light is fed back to the laser diode drive circuit 61.

Transmitted light from the above described beam splitter 44 is led by the carriage 47 to a irradiation position on the information recording medium 10 and directed at the information recording medium 10. The information recording medium 10 is rotated by a motor 71 at a fixed rotational frequency. The motor 71 as well as the above described laser diode drive circuit 61 and write data generating circuit 62 are controlled by predetermined control signals from a microcomputer (MPU, DSP) not shown.

During a write to a data region, write data is generated by the write data generating circuit 62 according to write information DATA and the information recording medium 10 is irradiated with pulsed laser light with a write power level which corresponds to the write data. The recording films of the information recording medium 10 is heated above a predetermined temperature by the laser light directed at the information recording medium 10 and a recording magnetic field is applied to a region including the irradiation position on the information recording medium 10 by a magnetic head 70. Consequently, marks are formed on the information recording medium 10 and the information is recorded using a sequence of marks and spaces.

During a read from a data region, the information recording medium 10 is irradiated with continuous light with a read power level which is lower than the above described write power level and is not so high as to overheat the recording films of the information recording medium 10 and a magnetic field for reproduction is applied by the magnetic head 70.

ID regions are read only by means of illumination and no magnetic field for reproduction is needed.

Returned light from the information recording medium 10 is reflected by the beam splitter 44, passes through a cylindrical lens 49 which causes astigmatism and a compound device 50, and is divided into three light fluxes: reflected lights L1 and L2 which have planes of polarization orthogonal to each other and direct light L3. The three light fluxes obtained by dividing the returned light is received by a light receiving element 51 for detection of reproduced signals.

Outputs from the light receiving element 51 for detection of reproduced signals are input in the four adder-subtractor circuits 52, 53, 54, and 55, which detect a focus error signal (FES), track error signal (TES), MO signal according to the sequence of marks and spaces in the data regions, and ID signal according to the wall IDs in the ID regions, respectively. The focus error signal and track error signal are used to control the carriage 47, and thus the irradiation position on the information recording medium 10 and the like.

Figure 4:
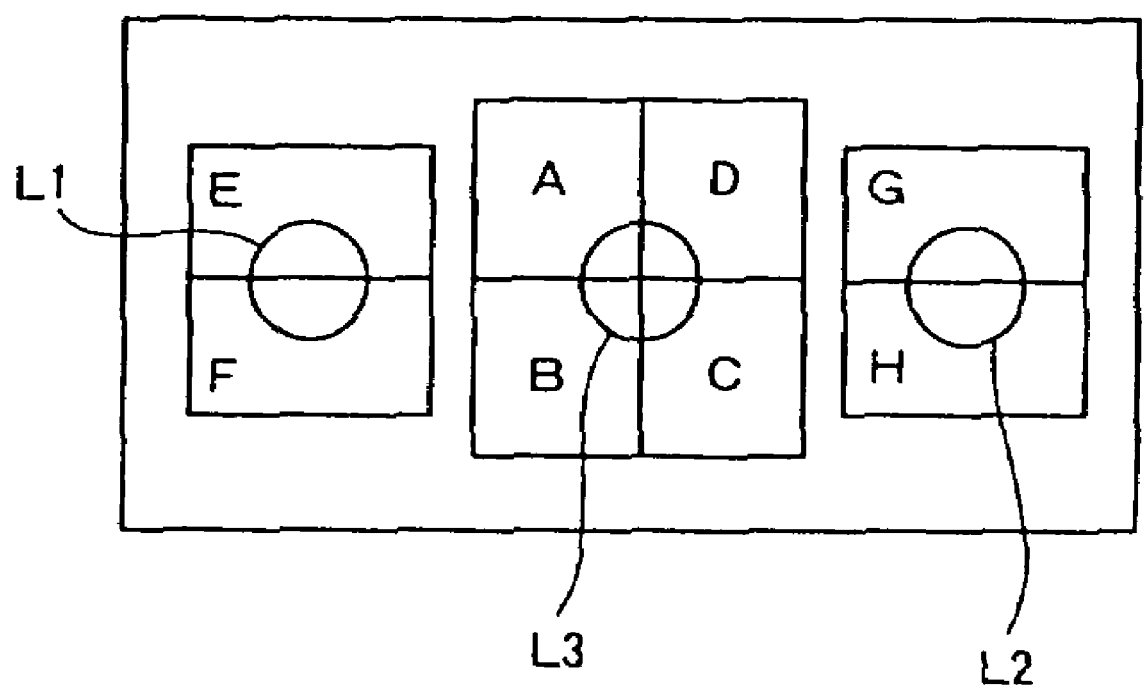
FIG. 4 is a detailed view of a light receiving surface of a light receiving element for detection of reproduced signals.

FIG. 4 is a detailed view of a light receiving surface of the light receiving element 51 for detection of reproduced signals.

The light receiving surface of the light receiving element 51 for detection of reproduced signals have eight regions A, B, C, D, E, F, G, and H. As the light receiving element 51 for detection of reproduced signals is positioned properly with respect to the compound device 50 in FIG. 3, the three lights from the compound device 50 are received as follows; the direct light L3 is split up and received by the regions A, B, C, and D, the reflected light L1 is split up and received by the regions E and F, and the reflected light L2 is split up and received by the regions G and H. This results in eight output signals SA, SB, SC, SD, SE, SF, SG, and SH with signal intensities proportional to the lights received by the eight regions A, B, C, D, E, F, G, and H, respectively.

The adder-subtractor circuit 52 shown in FIG. 3 determines the focus error signal by carrying out an operation (SA+SC)−(SB+SD) based on an astigmatic method while the adder-subtractor circuit 53 determines the track error signal by carrying out an operation (SA+SB)−(SC+SD) based on a push-pull method. The focus error signal and track error signal are used by the microcomputer described above for focus control and tracking control of irradiating light. Details of focus control and tracking control are not directly relevant to the present invention, and thus further description thereof will be omitted.

The adder-subtractor circuit 54 shown in FIG. 3 determines the MO signal by carrying out an operation (SE+SF)−(SG+SH). The adder-subtractor circuit 55 determines the ID signal by carrying out an operation (SE+SG)−(SF+SH). This operation determines a difference in the quantity of light between returned lights produced by the first half and second half of the beam spot moving along a track. The ID signal determined by this operation is a tangential push-pull signal (TPP) which represents a change in the quantity of light caused when the beam spot passes through an end of a mark.

Regarding the method for reading ID data, a summation signal method which determines the ID signal as total quantity of light reflected from marks is available in addition to the tangential push-pull method described above. The present invention may adopt either method.

The TPP method and summation signal method will be described below in comparison.

Figure 5:
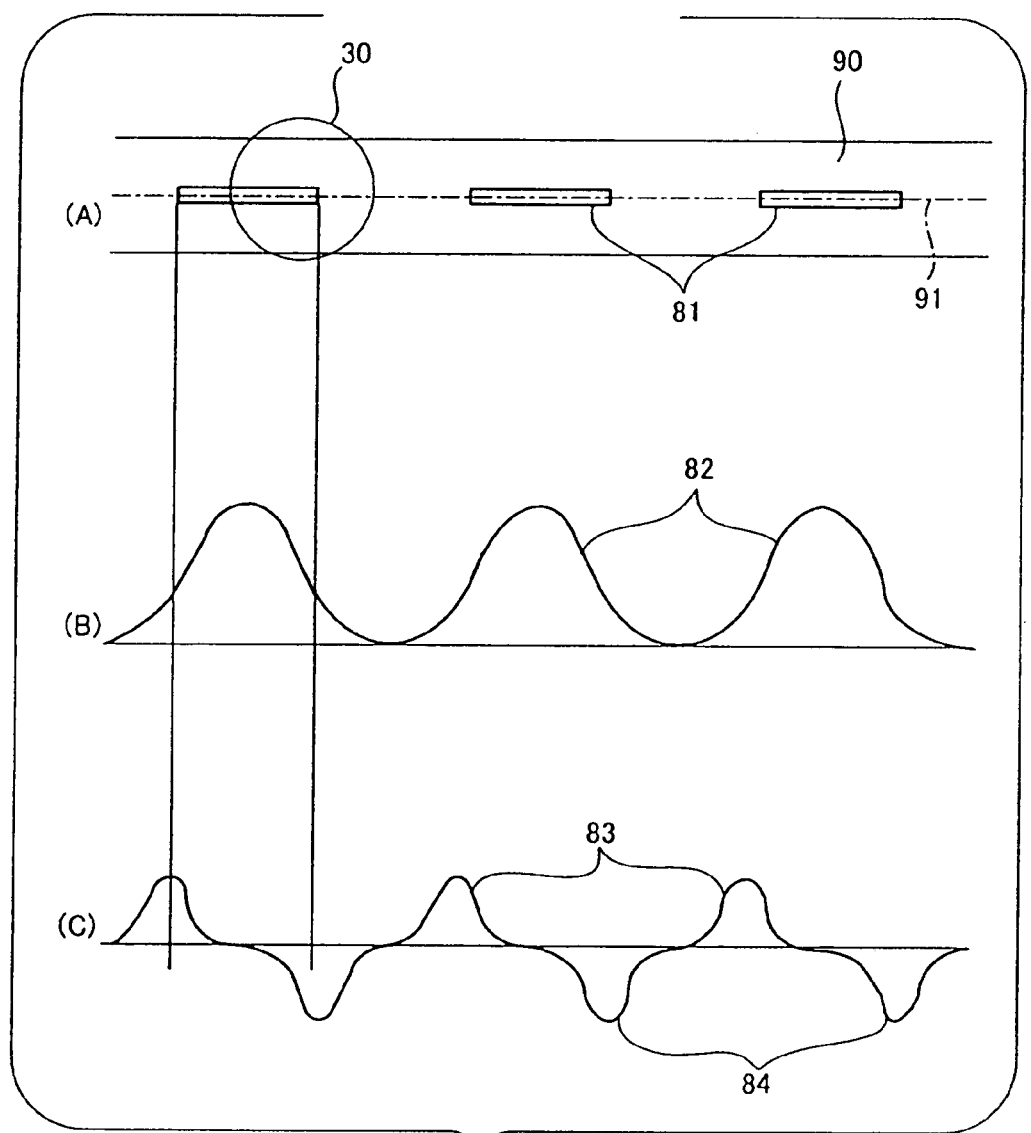
FIG. 5 is a diagram showing reading of marks equal in length to a spot diameter of a laser beam.

FIG. 5 is a diagram showing reading of marks equal in length to a spot diameter of a laser beam.

Part (A) of FIG. 5 shows positional relationship between the beam spot 30 of the laser beam and a sequence of marks and spaces. In this case, marks 81 equal in length to the spot diameter of the laser beam are located in the middle of a track 90 and the beam spot 30 moves along the center line 91 of the track 90 under tracking control.

Part (B) of FIG. 5 shows the waveform of a read signal obtained when the marks 81 shown in Part (A) of FIG. 5 are read out by the summation signal method. A peak 82 is obtained each time the beam spot 30 passes through a mark 81. A large mark length makes the peak 82 trapezoidal.

Part (C) of FIG. 5 shows the waveform of a read signal obtained when the marks 81 shown in Part (A) of FIG. 5 are read out by the TPP method. When the beam spot 30 falls on a mark 81, the signal forms a peak and when the beam spot 30 leaves the mark 81 the signal forms a valley. Thus, each time the beam spot 30 passes a mark 81, a pair of a peak 83 and a valley 84 are obtained. A larger mark length makes spacing between peak 83 and valley 84 wider.

Figure 6:
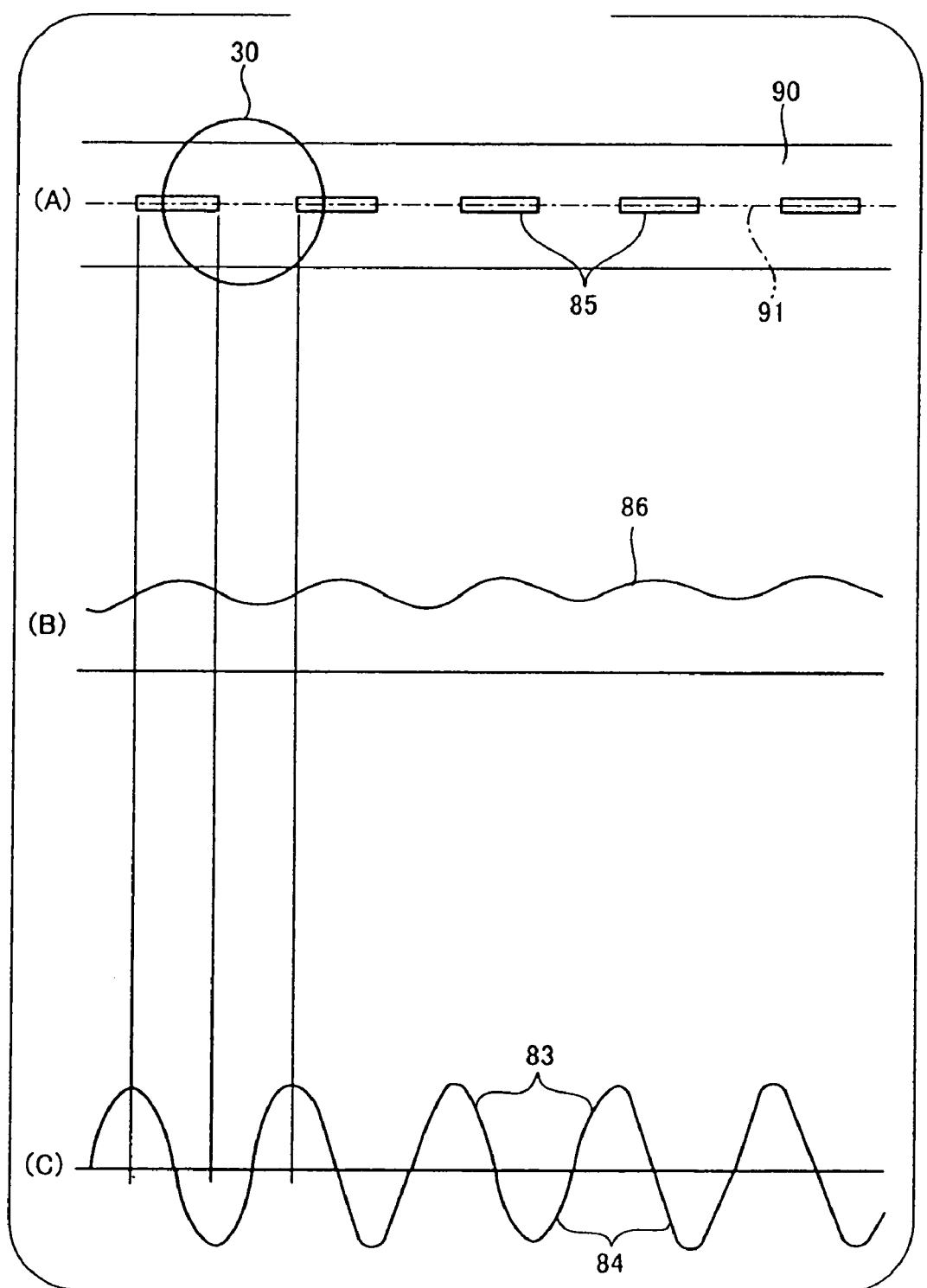
FIG. 6 is a diagram showing reading of marks equal in length to half the spot diameter.

FIG. 6 is a diagram showing reading of marks equal in length to half the spot diameter.

Part (A) of FIG. 6 shows relationship between the beam spot 30 of the laser beam and a sequence of marks and spaces as is the case with Part (A) of FIG. 5. In this case, marks 85 equal in length to half the spot diameter of the laser beam are located in the middle of a track 90.

Part (B) of FIG. 6 shows the waveform of a read signal 86 obtained when the marks 85 shown in Part (A) of FIG. 6 are read out by the summation signal method. Since the mark length is small, the signal intensity of the read signal 86 is half the signal intensity of the read signal shown in Part (B) of FIG. 5. Furthermore, since the mark length is small, bases of the peaks described above overlap. Therefore, the level of signal change needed to determine whether the beam spot has passed a mark does not occur in the read signal 86.

Part (C) of FIG. 6 shows the waveform of a read signal obtained when the marks 85 shown in Part (A) of FIG. 6 are read out by the TPP method. The signal intensity of the read signal shown in Part (C) of FIG. 6 is equivalent to the signal intensity of the read signal shown in Part (C) of FIG. 5. In the read signal shown in Part (C) of FIG. 6, pairs of a peak 83 and a valley 84 such as those described above are clearly visible again, making it easy to determine whether the beam spot 30 has passed a mark 85.

In this way, the mark length and mark interval distinguishable by the TPF method is as small as half the mark length and mark interval distinguishable by the summation signal method. Thus, by bearing in mind an information storage device which reads ID data by the TPP method, it is possible to reduce the area of the ID regions on the information recording medium.

Through adoption of the above described wall ID with the TPP method in mind, it is possible lo further reduce the ID regions.

Figure 7:
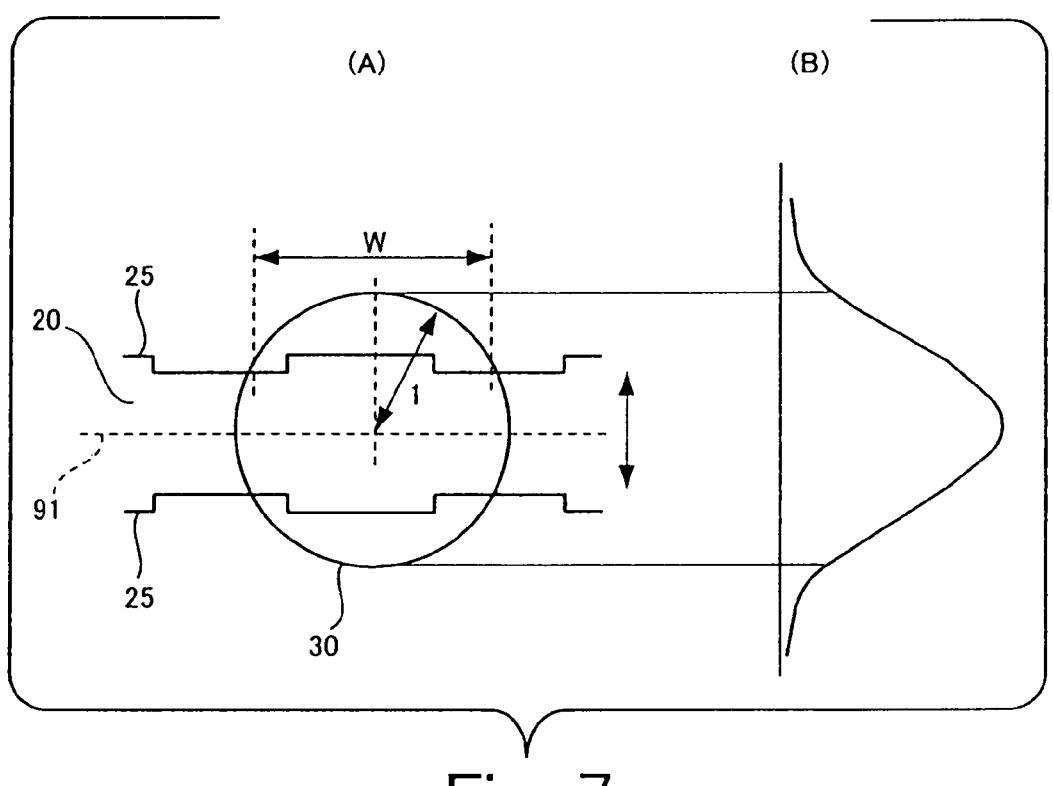
FIG. 7 is a diagram showing positional relationship between a wall ID and spot.

FIG. 7 is a diagram showing positional relationship between the wall ID and spot.

Part (A) of FIG. 7 shows positional relationship between the wall ID 25 and beam spot 30 assuming that the radius of the bean spot 30 is "1" and that the width of the track 90 is d while Part (B) of FIG. 7 shows light intensity distribution of the beam spot 30.

The beam spot 30 moves along the center line 91 of the track 20 with both sides of the beam spot 30 passing over the wall ID 25. Changes in the quantity of reflected light, which result when the light on both sides of the beam spot 30 is reflected by concave-convex geometry of the wall ID 25, are detected as the ID signal by the TPP method.

Since both sides of the beam spot 30 pass over the wall ID 25, the real width W of the beam spot 30 above the wall ID 25 is expressed as $$W=2\sqrt{(1-d^2)}<2$$

Thus, in terms of reading of ID data, virtually the same effect as reduction in the size of the beam spot 30 is produced when the wall ID 25 is read by both sides of the beam spot 30. This makes it possible to read ID data even if a wall ID has a concave-convex geometry with smaller intervals than the mark length or mark intervals which are obtained if a sequence of marks and spaces are provided on the center line 91 of a track. In other words, when lengths per bit (bit sizes) of ID data are compared, the bit size of the wall ID is smaller than the bit size of a mark-space sequence (concave-convex sequence) provided along the center line of a track. Thus, adoption of the wall ID makes it possible to implement ID regions with high recording density, reduce the area of ID regions, and increase the total memory capacity of the information recording medium.

Incidentally, a larger track width d will make it possible to read a wall ID with a smaller bit size and further reduce the area of ID regions. On the other hand, the laser beam is a so-called Gaussian beam, and the light intensity 1 of the beam spot 30 shows the distribution given by the following equation if r is the distance from the center of the spot, as shown in Part (B) of FIG. 7.

$$1=K\exp(-2r^2)$$

Thus, since the light intensity on both sides of the beam spot 30 is weaker than at the center of the spot, too large a track width d will make signal intensity at track boundaries too weak, making it impossible to read the wall ID.

Figure 8:
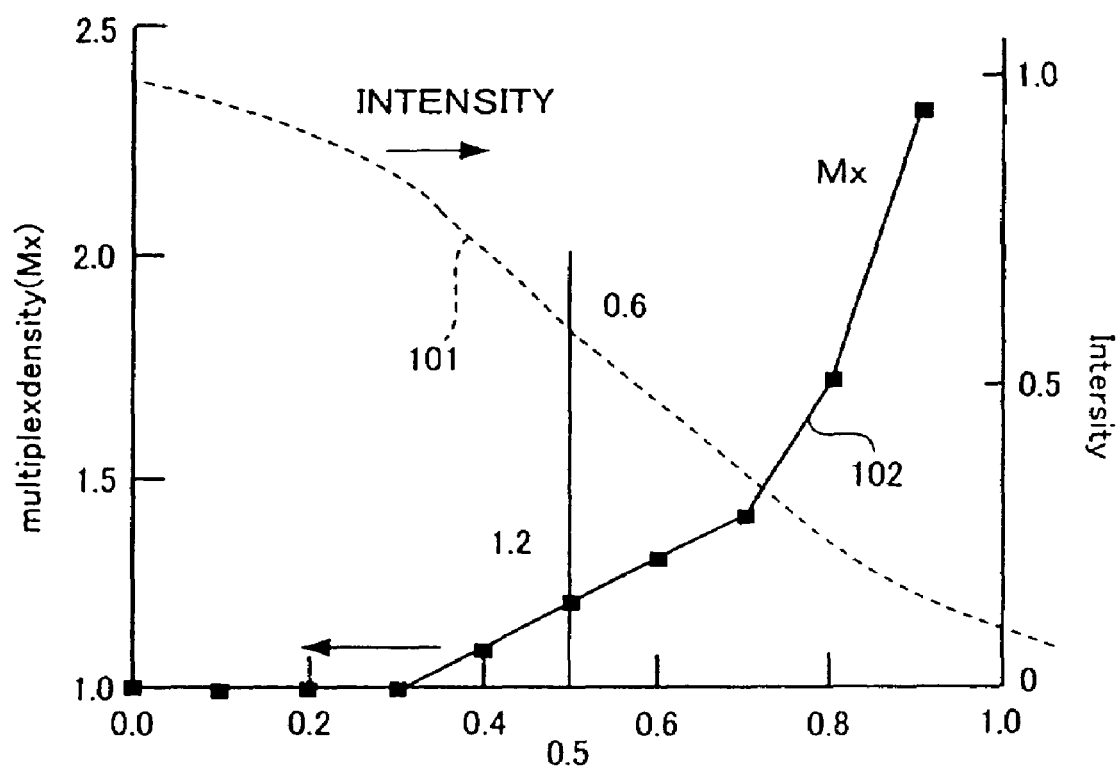
FIG. 8 is a graph showing an example of desirable track width.

FIG. 8 is a graph showing an example of desirable track width.

The horizontal axis in the graph of FIG. 8 represents the ratio of track widths to the spot diameter. The dotted line 101 and right-hand vertical axis represent the ratio of light intensity on the edges of the track to the light intensity at the center of the spot. The solid line 102 with square marks and left-hand vertical axis represent the ratio of the recording density of wall IDs to the recording density of marks on the center line of the track.

The light intensity of the beam spot follows a Gaussian distribution as described above, and thus the dotted line 101 in the graph is a downward-sloping curve. On the other hand, the solid line 102 in the graph is an upward-sloping curve, in which the curve becomes steeper as the abscissa value approaches "1."

As a desirable track width, for example, a track width equal to half the spot diameter is conceivable. In this case, the light intensity on the edges of the track is approximately 0.6 times the light intensity at the spot center, which means a sufficient light intensity. Besides, the recording density of the wall IDs is approximately 1.2 times the recording density of the marks on the center line of the track. Consequently, the ID regions can be reduced by approximately 16% and the capacity of the entire information recording medium,is expected to be increased by as much as 48 Mbytes.

The wall ID 25 shown in FIG. 2 is an implementation example of the track width shown in FIG. 8. Whereas the spot diameter of the beam spot 30 is 1 μm, the width of the wall ID 25 is 0.5 μm. Also, whereas the bit size of a mark-space sequence (concave-convex sequence) which is intended only for the TPP method is 0.25 μm, the bit size of the wall ID 25 is 0.21 μm. Besides, the wall ID 25 is protruded and recessed 0.2 μm along the width of the track, causing the width of the grooves 20*a* and width of the lands 20*b* to change 0.4 μm from 0.3 μm to 0.7 μm. A track pitch, i.e., average track width is 0.6 μm. Thus, in some places, the grooves 20*a* or lands 20*b* are wider than the average track width.

Groove 20*a* or land 20*b* width larger than the average track width has the same effect as formation of emboss pits larger than the track pitch, In contrast, conventional emboss pits cannot form a larger mark than the track pitch Therefore, the intensity of read signals resulting from wall IDs are higher than the intensity of the read signals resulting from conventional emboss pits. Also, the wall IDs are easier to read than the conventional emboss pits. Thus, the adoption of the wall ID makes it possible to read ID data in a stable and reliable manner. Furthermore, wall IDs which correspond to emboss pits larger than the track pitch can be created more easily by the laser machining described above than the conventional emboss pits.

When the information recording medium is a magneto-optical disk, whereas the groove depth suitable for detecting conventional emboss pits is approximately 100 nm, the groove depth suitable for recording and reproducing information in data regions is approximately 60 nm. Therefore, if the groove depth is determined giving priority to the data regions, there is the problem that it will be difficult to read ID data. In contrast, if the wall ID described above is used for a magneto-optical disk, even if the groove depth is determined giving priority to the data regions, the intensity of read signals is large enough to make it easy to read the ID data.

If the rectangular projections and depressions of wall IDs are considered as meandering of walls 25, the center of the meandering is offset to the groove 20a in the groove data part 22a of the ID region 22 and it is offset to the land 20b in the land data part 22b of the ID region 22. Therefore, the average track width in the ID regions 22 of the sectors in the groove 20a is 0.5 µm in the groove data parts 22a, and 0.7 µm in the land data parts 22b When the beam spot 30 is moving along the groove 20a, a strong ID signal is obtained and the ID data for the groove is recognized in the groove data parts 22a where the track width is narrow. Similarly, the average track width in the ID regions 22 of the sectors in the land 20b is 0.5 µm in the land data parts 22b, and 0.7 µm in the groove data parts 22a. When the beam spot 30 is moving along the land 20b, a strong ID signal is obtained and the ID data for the land is recognized in the land data parts 22b where the track width is narrow. In this way, in the ID regions 22, the groove data parts 22a and land data parts 22b are recognized separately.

Incidentally, according to the above embodiment, in which wall IDs with rectangular projections and depressions are used, reduction in the effect of light near the center of the beam spot enhances the effect produced by the adoption of the wall ID, i.e., virtually the same effect as reduction in the size of the beam spot. Therefore, it is desirable that the protrusions which constitute wall IDs and extend from the edges of the track toward the center of the track taper toward the center line of the track.

Figure 9:
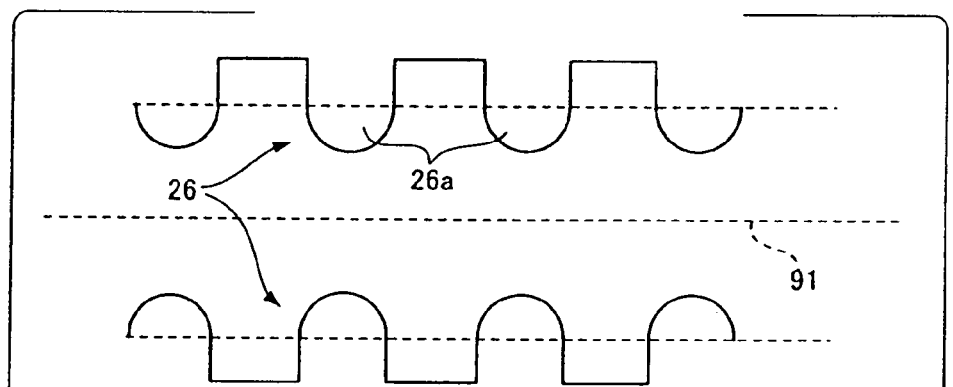
FIG. 9 is a diagram showing a second example of a wall ID.

FIG. 9 is a diagram showing a second example of a wall ID.

FIG. 9 shows wall IDs 26 with arc-shaped protrusions 26a, which taper toward the center line 91 of the track.

Figure 10:
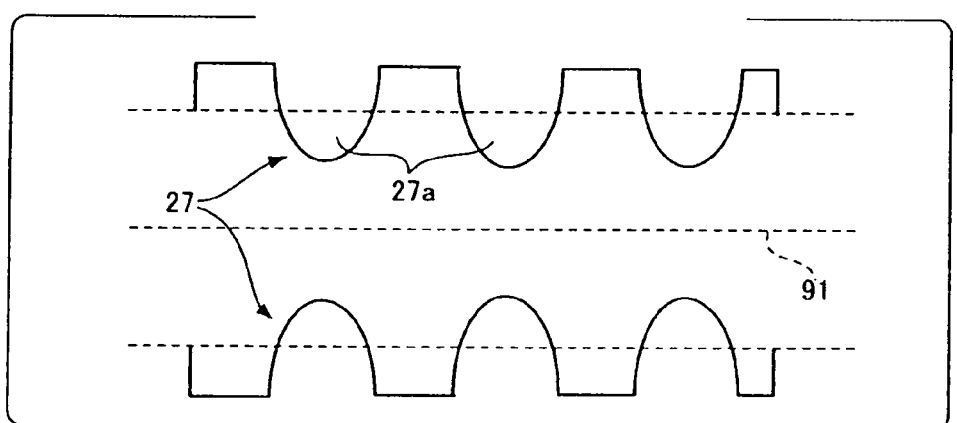
FIG. 10 is a diagram showing a third example of a wall ID.

FIG. 10 is a diagram showing a third example of a wall ID.

FIG. 10 shows wall IDs 27 with elliptical protrusions 27a, which also taper toward the center line 91 of the track.

Figure 11:
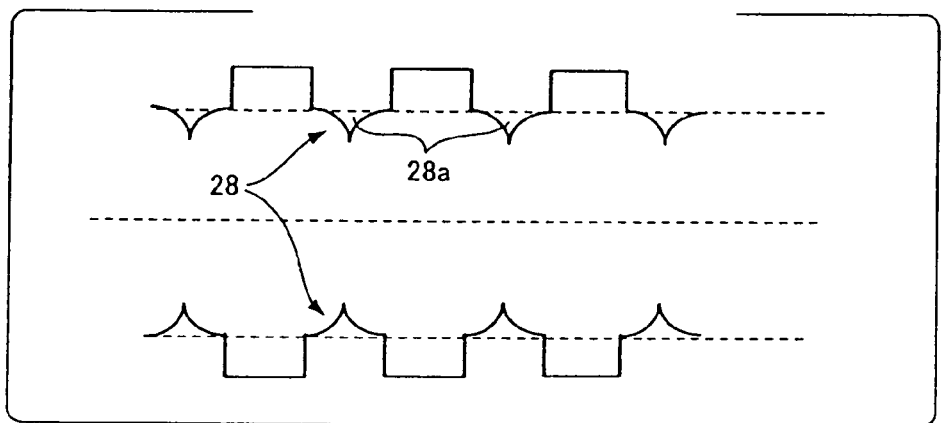
FIG. 11 is a diagram showing a fourth example of a wall ID.

FIG. 11 is a diagram showing a fourth example of a wall ID.

FIG. 11 shows wall IDs 28 with pointed protrusions 28a formed by two inverted arcs. These protrusions 28a also taper toward the center line 91 of the track.

It is easier to form the wall IDs shaped as a combination of such circles or ellipses by the above described laser machining than the wall IDs in rectangular shape.

Incidentally, in all the wall IDs shown in FIGS. 2, 9, 10, and 11, their protrusions and recesses are intersected by their center line (broken line) at the same position.

Also, in the embodiment described above, the wall IDs are adopted assuring that the ID data is read by the TPP method, but the reading method of ID data according to the present invention is not limited to this as long as the ID data are recorded by means of protrusions and recesses on the edges of sectors or tracks.

Also, although an information recording medium and information recording device based on the magneto-optical recording method are illustrated in the embodiment described above, information recording media and information recording devices according to the present invention are not limited by the method for recording and reproducing information in data regions, and the present invention can be applied to various optical recording media such as CD, CD-R, CD-RW, DVD, and DVD-R as well as to their corresponding information recording devices. Also, the present invention can be applied to magnetic recording media which employ optical tracking as well as to information recording devices for such media. Furthermore, information recording media according to the present invention can be implemented not only as disk-shaped media, but also as card (rectangular) media.

The invention claimed is:

1. An information recording medium provided with land tracks and groove tracks arranged alternately, both of which contain information storage stripes for recording data, the information recording medium comprising in each of the information storage stripes:

a data region where the data are recorded; and an identification region where boundaries between land tracks and groove tracks are protruded and recessed along the width of the land tracks and groove tracks, respectively, according to identification information which distinguishes the information storage stripes, the identification region further comprising a land identification section where an averaged position of the boundary between the land track and groove track is offset relative to the land track and a groove identification section where an averaged position of the boundary between the land track and groove track is offset relative to the groove track, and wherein an averaged width of the land tracks at positions where the land identification sections are provided is narrower than an averaged width of the land tracks at positions where the groove identification sections are provided, and an averaged width of the groove tracks at positions where the groove identification sections are provided is narrower than an averaged width of the groove tracks at positions where the land identification sections are provided.

* * * * *

UNITED STATES PATENT AND TRADEMARK OFFICE
CERTIFICATE OF CORRECTION

| | | |
|---|---|---|
| PATENT NO. | : 7,321,544 B2 | Page 1 of 1 |
| APPLICATION NO. | : 10/626270 | |
| DATED | : January 22, 2008 | |
| INVENTOR(S) | : Satoshi Yamashita | |

It is certified that error appears in the above-identified patent and that said Letters Patent is hereby corrected as shown below:

TITLE PAGE

Insert --(62) Related U.S. Application Data

Continuation of PCT/JP01/00825, filed February 6, 2001--.

Signed and Sealed this

First Day of July, 2008

JON W. DUDAS
*Director of the United States Patent and Trademark Office*